Nov. 22, 1966  P. A. SOSNOSKI  3,287,603
GROUND FAULT PROTECTIVE CIRCUITRY
Filed Oct. 23, 1963

Peter A. Sosnoski
INVENTOR.

BY *Clarence A. O'Brien*
and *Harvey B. Jacobson*
Attorneys

United States Patent Office 3,287,603
Patented Nov. 22, 1966

1

3,287,603
GROUND FAULT PROTECTIVE CIRCUITRY
Peter A. Sosnoski, 500 State St., Shamokin, Pa.
Filed Oct. 23, 1963, Ser. No. 318,380
12 Claims. (Cl. 317—18)

This invention relates to a protective circuit system for electrical power supplies and constitutes an improvement over the system disclosed and claimed in my prior Patent No. 2,844,765.

The system of the present invention is particularly useful in connection with different types of electrical power supplies involving relatively high potentials and is operative to prevent flow of dangerously high currents in the event any of the electrical lines of the power supply become grounded, and is also effective to equalize flow of current from grounded lines and identify those lines which may become grounded.

It is therefore a primary object of the present invention to provide a protective system for electrical power lines connected to power consuming devices so as to avoid injury due to excessive currents occurring through any of such lines when grounded because of faulty insulation or the like.

Another object of the present invention is to provide a protective system capable of being applied to alternating current power supply circuits involving a plurality of power lines, in accordance with different supply voltages.

A further object of the present invention is to provide a protective system for alternating current power supplies operative to limit current from ground to a safe value regardless of the line which is faulty and through which grounding occurs, the system also being operative through use of any required number of gas filled glow tubes, to indicate the flow of current from ground and identify the lines which may have become grounded or partially grounded. The system of the present invention is therefore associated with a circuit breaker arranged to interrupt the flow of current through the power lines should excessive current flow from ground develop.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
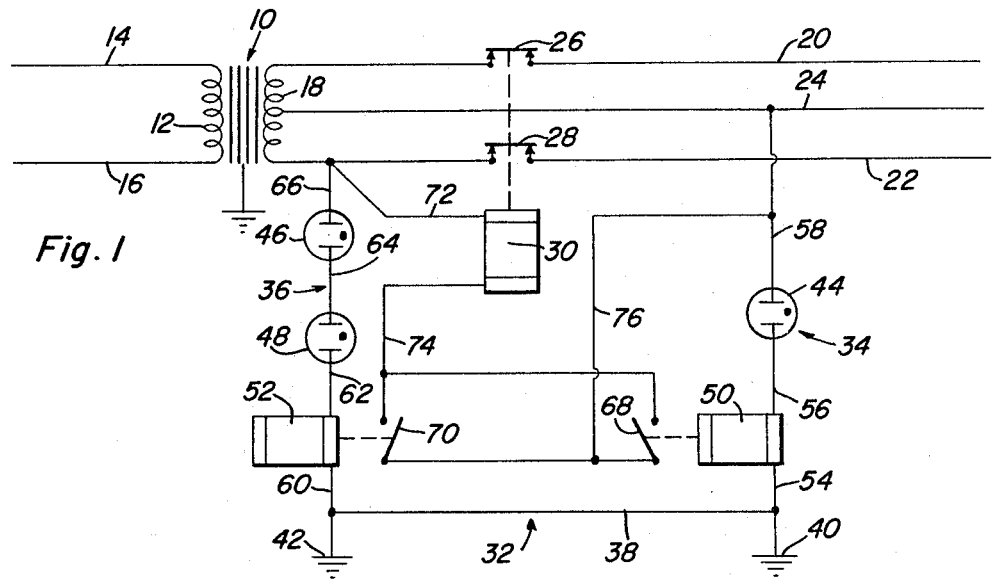
FIGURE 1 is an electrical circuit diagram showing the installation of the protective system of the present invention associated with one form of electrical power supply.

Referring now to the drawings in detail, attention is initially invited toward FIGURE 1 showing an electrical power supply involving a transformer 10, the primary 12 of which is connected by the lines 14 and 16 to a source of A.C. voltage. The secondary 18 of the power supply is connected by the power lines 20 and 22 to a single phase, alternating current, power consuming device. Also associated with the power lines 20 and 22, is a neutral line 24 connected to a center tap on the secondary 18, it being appreciated that under normal, balanced conditions, no current flows through the neutral line. Accordingly, a potential difference ordinarily exists between each of the power lines and the neutral line which is the sum of the potential difference between the lines 14 and 16. In the case of the power supply illustrated in FIGURE 1, the flow of current is interrupted upon opening of the circuit breaker contacts 26 and 28 respectively associated with power lines 20 and 22, said contacts 26 and 28 representing the usual circuit breakers opened in case of overload

2 or short circuiting but also opened in accordance with the present invention upon energization of the solenoid coil 30 in the event of line grounding.

The solenoid coil 30 is connected to one form of protective system generally referred to by reference numeral 32 which includes a current limiting circuit consisting of two branches 34 and 36 respectively interconnected by line 38 to ground at 40 and 42. The branch 34 is connected to the neutral line 24 so that if the power line 22 should become grounded, a return current path will be established from ground 40 through the branch 34 and the neutral line 24, the branch 34 then being operative to limit the current because of the relatively high impedance thereof. Similarly, should the neutral line 24 become grounded, a return current path for current flow from ground originating through the neutral line will be established, to the power line 22 through the branch 36 also provided with a relatively high but different impedance so as to limit such current flow from ground. The branch 34 is therefore shown as being provided with a single gas filled glow tube 44 such as a neon lamp while the branch 36 is provided with two gas filled glow tubes 46 and 48 connected in series establishing a higher impedance inasmuch as the branch 36 is connected to the power line 22 having a higher potential than the neutral line 24 to which the branch 34 is connected. Current conducted through the branches 34 and 36 are therefore substantially equal when either the power line 22 or the neutral line 24 becomes grounded. It will also be apparent, that should power line 20 become grounded, return current paths will be established from grounds 40 and 42 through both the branches 34 and 36. The higher impedance of branch 36 equalizes the current flow therein produced by the higher potential difference between lines 20 and 22, with the current flow in branch 34 produced by a lower potential difference between lines 24 and 22.

From the foregoing, it will be apparent that current flow through branch 34 because of a faulty power line 22 will be reflected by glow of the neon tube 44 so as to identify the source of trouble in the power line 22. Glow of the neon tubes 46 and 48 on the other hand, will identify the source of trouble in the neutral line 24. Glow of all the neon tubes in both branches 34 and 36 will identify the source of trouble in the power line 20. It should also be apparent, that the number of neon tubes connected in series may be varied in accordance with the voltages being handled in the power lines to accordingly vary the impedances of the branches 34 and 36.

Associated with each of the current limiting branches 34 and 36, and connected in series with the gas filled glow tubes therein, are current responsive relay coils 50 and 52. Relay coil 50 is therefore provided with one terminal connected by conductor 54 to ground and another terminal connected by the conductor 56 to the neon tube 44 which in turn is connected by the conductor 58 to the neutral line 24. Similarly, one terminal of the relay coil 52 is connected by the conductor 60 to ground 42, the other terminal thereof being connected by the conductor 62 to the neon tube 48 which in turn is connected in series to the neon tube 46 by the conductor 64, the neon tube 46 in turn being connected by the conductor 66 directly to the power line 22 preceding the circuit breaker contact 28. Respectively associated with the relay coils 50 and 52, are normally open relay switches 68 and 70.

The relay switches when closed upon energization of the relay coils 50 and 52, alternatively and simultaneously establish an energizing circuit for the solenoid coil 30 which is therefore provided with one terminal connected directly to the power line 22 by the conductor 72, the other terminal of the coil 30 being connected by conductor 74 to both fixed contacts associated with the relay switches 68 and 70. The relay switches 68 and 70 are therefore both connected through the conductor 76 to the neutral line 24. It will therefore be apparent, that closing of either one of the relay switches 68 or 70, will complete an energizing circuit through the solenoid coil 30 across the power line 22 and neutral line 24 in order to open the contacts 26 and 28 associated with both the power lines 20 and 22.

Operation of the protective system illustrated in connection with FIGURE 1 will be apparent inasmuch as grounding of any of the electrical lines 20, 22 or 24 will produce current flow through either or both of the branches 34 and 36 as indicated by glow of the neon tubes so as to identify the source of trouble. Should the currents become excessive or dangerous, the relay coils 50 or 52 will be energized in order to establish an energizing circuit for the solenoid coil 30 in order to interrupt the flow of current through the power lines and thereby prevent injury to any person through which ground may be established. The use of different numbers of neon tubes in each of the independent branches will also be effective to equalize the ground currents and provide an indication of trouble prior to development of dangerous ground current by glow at less than full brilliance.

Figure 2:
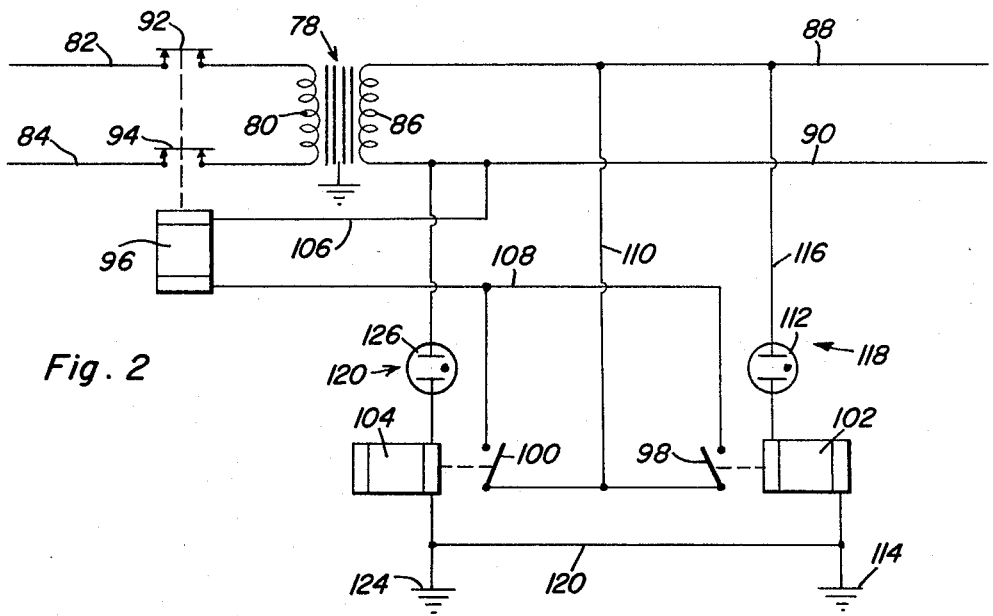
FIGURE 2 is an electrical circuit diagram showing the system of the present invention associated with another form of electrical power supply.

FIGURE 2 illustrates an electrical power supply of the alternating current type which does not involve any neutral line. The power supply therefore includes the transformer 78 having a primary 80 connected by the lines 82 and 84 to a source of A.C. voltage. The secondary 86 is connected by the power lines 88 and 90 to the power consuming device. In the case of the system illustrated in FIGURE 2, the circuit breaker contacts 92 and 94 are associated with the primary circuit of the transformer so as to interrupt the electrical connections to the voltage source when the circuit breaker coil 96 is energized. An energizing circuit for the coil 96 is therefore established across the power lines 88 and 90 when one or both of the relay switches 98 and 100 are closed upon energization of the relay coils 102 and 104 respectively. The circuit breaker coil 96 is therefore connected by the conductor 106 to the power line 90 and by the conductor 108 to the fixed contacts associated with the relay switches 98 and 100. The relay switches are in turn both connected by the conductor 110 to the power line 88. The relay coil 102 is connected in series with the gas filled glow tube 112 so as to establish a high impedance ground return path between ground at 114 and power line 88 connected by the conductor 116 to the tube 112. The relay coil 102 and tube 112 therefore form one branch 118 of the current limiting circuit interconnected by the ground line 120 to the other branch 122 thereof which includes the relay coil 104 connected between ground at 124 to the power line 90 in series with the neon tube 126. Operation of the protective system illustrated in FIGURE 2 is similar to that described with respect to FIGURE 1 except that no neutral line is involved so that the branches of the current limiting circuit may be provided with equal high impedance established by one or more neon tubes in the circuit branches depending upon the voltages being handled by the power lines. It will also be apparent, that in the case of the arrangements illustrated in both FIGURES 1 and 2, operational reestablishment of the power supplies will only occur when the fault is corrected and the current responsive relay coils in the circuit limiting branches become deenergized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A protective system for an alternating current power supply having a plurality of current carrying power lines at relatively high potentials relative to ground, comprising; a current limiting circuit having at least two monitoring branches establishing return current paths from ground to said power supply, high impedance means in each of said branches for indicating and limiting flow of current through said return current paths, circuit breaker means electrically connected to one of said power lines independently of the current limiting circuit for interrupting current flow in said power lines when energized, and current responsive means in series with said high impedance means in said current limiting circuit for energizing the circuit breaker means in response to flow of excessive current in at least one of the return current paths, said high impedance means being operative to substantially equalize current flow from ground through said return current paths to identify the power line that is grounded.

2. The combination of claim 1 wherein said high impedance means includes at least one gas filled glow tube in one of the return current paths and series connected glow tubes in another of said return current paths.

3. The combination of claim 2 wherein said power supply includes, a transformer having a secondary to which the power lines are connected and a neutral line, one of said branches being connected to the neutral line for establishing one of the return current paths through the neutral line when an unbalanced condition arises because of grounding of said one power line, another of said branches being connected to said one power line and having said series connected glow tubes therein to equalize the current flow when occurring through the respective return current paths.

4. The combination of claim 3 wherein said current responsive means comprises a circuit closing relay in each of said branches of the current limiting circuit connected in series with said gas filled glow tubes.

5. The combination of claim 4 wherein said circuit breaker means comprises a switch opening coil connected to said one power line, and a relay switch operated by each of the current responsive means for alternatively or simultaneously completing an energizing circuit for the coil.

6. The combination of claim 1 wherein said circuit breaker means comprises a switch opening coil connected to said one power line, and a pair of relay switches operated by the current responsive means for alternatively or simultaneously completing an energizing circuit for the coil.

7. The combination of claim 6 wherein said high impedance means includes at least one gas filled glow tube in each return current path.

8. The combination of claim 7 wherein said power supply includes, a transformer having a secondary to which the power lines are connected, said branches being connected across two of the power lines for establishing the return current paths when an unbalanced condition arises because of grounding of one of the power lines.

9. The combination of claim 8 wherein said current responsive means comprises a circuit closing relay in each of said branches of the current limiting circuit connected in series with at least one of said gas filled glow tubes.

10. The combination of claim 1 wherein current limiting circuit includes a plurality of branches connected to ground, said high impedance means including at least one gas filled glow tube in each of said branches, at least one of the power lines being directly connected in parallel to said circuit breaker means and one of said gas filled glow tubes.

11. A ground detecting and protective system for a power supply having a plurality of power lines carrying current comprising; at least two current monitoring branches, respectively connecting two of said power lines to ground, current responsive means connected in each of said branches for sensing excessive ground current, circuit breaker means connected to said current responsive means for interrupting flow of current in said power lines in response to flow of said excessive ground current in at least one of the branches, first current indicating means connected in one of the branches in series with the current responsive means for limiting flow of ground current therethrough in response to grounding of one of the power lines, second current indicating means in series with the current responsive means in the other of said branches for conducting ground current substantially equal to the ground current conducted through said first current indicating means in response to grounding of another of said power lines, said current indicating means having impedance values respectively corresponding to the potential levels of the respective power lines to which the branches are connected for limiting the ground currents to substantially equal values in the respective branches.

12. The combination of claim 11 wherein said first current indicating means includes at least one neon lamp illuminated in response to grounding of the power line to which the second current indicating means is connected, said second current indicating means including at least two neon lamps illuminated in response to grounding of the power line to which said first current indicating means is connected, all of said neon lamps being illuminated in response to grounding of the power line to which none of said branches is connected.

References Cited by the Examiner

UNITED STATES PATENTS

| | | | |
|---|---|---|---|
| 2,053,988 | 9/1936 | Ferris et al. | 317—18 X |
| 2,660,717 | 11/1953 | Hood | 340—255 |
| 2,697,217 | 12/1954 | Jeffers | 317—18 X |
| 2,844,765 | 7/1958 | Sosonowski | 317—18 |

FOREIGN PATENTS

| | | |
|---|---|---|
| 454,292 | 9/1938 | Great Britain. |
| 611,871 | 11/1948 | Great Britain. |

MILTON O. HIRSHFIELD, *Primary Examiner.*

SAMUEL BERNSTEIN, *Examiner.*

R. V. LUPO, *Assistant Examiner.*